(12) United States Patent
Arnold

(10) Patent No.: US 6,457,295 B1
(45) Date of Patent: Oct. 1, 2002

(54) ROUND BALER

(75) Inventor: Martin Arnold, Salzgitter-Bad (DE)

(73) Assignee: Lely Welger Maschinenfabrik GmbH, Wolfenbüttel (DE)

( * ) Notice: Subject to any disclaimer, the term of this patent is extended or adjusted under 35 U.S.C. 154(b) by 0 days.

(21) Appl. No.: 09/521,690

(22) Filed: Mar. 9, 2000

(30) Foreign Application Priority Data

Mar. 10, 1999 (DE) .......................... 199 10 555

(51) Int. Cl.⁷ .............................................. B65B 13/20
(52) U.S. Cl. .......................................... 53/211; 53/430
(58) Field of Search ................... 53/430, 503, 504, 53/508, 587, 211

(56) References Cited

U.S. PATENT DOCUMENTS

| | | | |
|---|---|---|---|
| 3,820,453 A | 6/1974 | Tipton | 100/188 R |
| 4,172,414 A | * 10/1979 | Klinner et al. | 100/4 |
| 4,362,097 A | 12/1982 | Rogers | 100/99 |
| 4,604,855 A | * 8/1986 | Krone et al. | 53/64 |
| 4,742,880 A | * 5/1988 | Schrag et al. | 177/136 |
| 4,961,679 A | * 10/1990 | Van Eecke et al. | 414/111 |
| 5,048,271 A | * 9/1991 | Walton | 53/587 |
| 5,384,436 A | 1/1995 | Pritchard | 177/136 |
| 5,551,218 A | * 9/1996 | Henderson | 53/504 |

FOREIGN PATENT DOCUMENTS

| | | |
|---|---|---|
| DE | 8213107 | 9/1982 |
| DE | 4436128 | 3/1996 |

\* cited by examiner

*Primary Examiner*—Scott A. Smith
*Assistant Examiner*—Nathaniel Chukwurah
(74) *Attorney, Agent, or Firm*—Sidley Austin Brown & Wood, LLP

(57) ABSTRACT

A round baler for forming round bales of harvest products and including a compression chamber housing in which the round bales are formed and a weighing device for determining weight of compressed bales and formed as an unrolling device arranged downstream of an ejection side of the compression chamber housing.

15 Claims, 3 Drawing Sheets

ROUND BALER

BACKGROUND OF THE INVENTION

1. Field of the Invention

The present invention relates to a round baler for forming round bales of harvest products such as hay, straw or wilted grass and including a weighing device for determining the weight of compressed bales.

2. Description of the Prior Act

A round baler with a weighing device is disclosed in U.S. Pat. No. 4,362,097. In the round baler disclosed in U.S. Pat. No. 4,362,097, a rocker is pivotally attached to a side of a round baler by a hydraulic cylinder. A manometer for measuring the pressure is mounted on the hydraulic cylinder. The hydraulic pressure serves as a measure of a bale weight of a bale formed in the baler. With an increase of the bale weight, the compression chamber housing sinks relative to the support axle, the piston moves in the hydraulic cylinder in, increasing the hydraulic pressure. The drawback of this arrangement consists in that the weighing device is mounted only on one side of the baler which lead to imprecise weighing results. Further, no means is provided for correcting false weighing results caused by transverse and/or longitudinal tilt of the baler. Still further, the mounting of the weighing device and its calibration in the mounted conditions is connected with large expenses. Moreover, the measurement results, in particular, at relatively small weights, e.g., about 350 kg/bale for straw, are imprecise because the weighing device also measure the empty weight of the baler which exceeds the bale weight in several time. Also, the running gear forces act as disturbance variables influencing the weighing results.

In an article "Ansaatze zur automatisierten Arbeitszeitermittlung bei Feldarbeiten (Attachments for Automatic Operational Time Determination", 51, LANDTECHNIK (Agricultural Technology), 4/96, pp. 198–199, there is disclosed a method of determining yield by weighing with the aid of deformation measuring tapes provided on or by measuring the vertical acceleration of the drawbar/axle of the round baler. The described method has the same drawbacks as the weighing method disclosed in U.S. Pat. No. 4,362,097.

German Publication DE 195 43 343 A1 describes a problem encountered during the weight determination of a bale which consists in that the bale, upon being ejected, is in a movable condition, and that the disturbance variables, resulting from the movement of the bale, can prevent a correct weight measurement. To solve this problem, the German reference proposes to stop the movement of a bale for a short time period to weight it, and to provide suitable sensors for determining the disturbance variables and for filtering them out and, also, to effect several measurement one after another to obtain a mean measurement value. A short-time stoppage of the bales adversely affect the thruput of the baler and, at a relatively high bale weight up to 1500 kg/bale of a wilted product, is constructively difficult. This method further requires use of expensive and controllable constructional parts.

Accordingly, an object of the present invention is to provide a weighing device for round balers that would insure a high precision (with a measurement tolerance of less than 2%) of the weight measurement.

Another object of the present invention is to provide a weighing device for round balers that can easily be mounted on conventional round balers without any calibration expenses.

A further object of the present invention is to provide a weighing device for a round baler that would eliminate the influence of the running gear forces and would not include movable elements.

SUMMARY OF THE INVENTION

These and other objects of the present invention, which will become apparent hereinafter, are achieved by forming the weighing device as bale unrolling device. The unrolling device is characterized by a simplicity of construction and is suitable for precise weighing of bales.

Usually, round bales are provided with unrolling devices having an inclined plane and which provide for rolling off the bales in an idle condition of the baler after pivotal movement of the rear housing into its open position. The present invention is based on using the rolling movement of the bale for its weighing which provide different advantages such as:

- the determination of the bale weight is effected independently from running gear forces and compression forces and independently from the delivery of product and of whether an end of the unrolling device is supported on the ground;
- the operation of the baler is not hindered or delayed;
- the weighing device is completely integrated in the unrolling device, can be easily mounted and, in particular, can be calibrated before being mounted on a baler;
- no modification of the baler itself is necessary;
- the weighing device has no movable parts;
- the adverse effect of the transverse and longitudinal tilt of the baler can be easily eliminated by correction measures;
- the weight tolerances are less than 2%.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
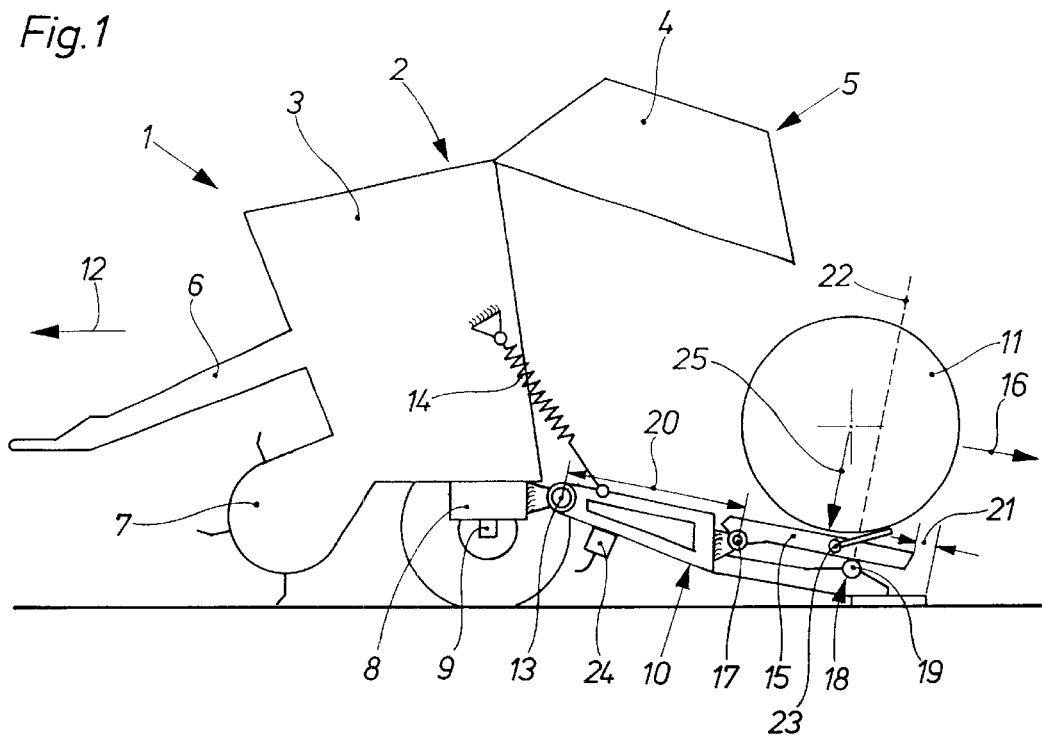
FIG. 1 a schematic side view of a first embodiment a round baler according to the present invention with an unrolling device and an integrated weighing platform.

A conventional round baler includes a compression chamber housing 2 formed of a front stationary housing part 3 and rear housing part 4 pivotable about an upper pivot axle. Both housing parts 3 and 4 form, in their closed condition, a variable or constant volume compression chamber, not shown, for producing round bales. In FIG. 1, the rear housing part 4 is shown in an open position 5 after the ejection of a bale. The front housing part 3 is connectable with a drawbar 6 to a tractor, not shown. The front housing part has a pick-up device 7 for harvest products and is supported on a chassis 8. At the height of an axle 9, at the lower end of the front housing part 3, there is provided an unrolling device 10. The unrolling device 10 extends rearwardly with respect to the travel direction 12 of the baler and pivots about a horizontal axis 13 for rolling off of the bales. The horizontal axis 13 extends transverse to the travel direction 12. A spring 14, which is provided between the front housing part 3 and the unrolling device 10, pulls the unrolling device 10 upward against a stop, not shown, into an upper position, also not shown. The stop provides for an unobstructed pivotal movement of the rear housing part 4. The width of the unrolling device 10 is smaller than the inner width of the compression chamber of the housing 2. The unrolling device 10 can be formed of two separate, spaced from each other frames, as a U-shaped shackle, or be formed of a single platform.

According to the invention, a weighing platform 15 for measuring normal forces during rolling of a bale 11 is provided on the unrolling device 10. The weighing platform 15 is connected, at its opposite sides, with the unrolling device 10 by rear, in the rolling direction 16, bolt/bracket connections 17 arranged parallel to the axle 13. The weighing platform 15 is supported on a front, in the rolling direction 16, movable bearing 18 that serves as a measurement element, i.e., as a force sensor 19. The force sensor 19 is so formed and arranged that it can measure only forces acting perpendicular to the weighing platform 15. The dimensions and the arrangement of the weighing platform is so selected that a round bale 11, after being ejected from the front housing part 3, rolls along an inclined plane formed by the unrolling device 10 onto the weighing platform 15. During its further rolling movement, its gravity center for a short time is located at a right angle to an operational line 22 of the force sensor 19, and it rolls off the weighing platform 15, without simultaneously touching the ground or the rolling device. In order to insure that the bales 11 roll onto the weighing platform only when the unrolling device 10 is supported on the ground, a first minimal distance 20 between the rotational axle 13 of the unrolling device 10 and the beginning of the weighing platform 15, should be maintained. In order to prevent false measurements, it is important to maintain a second minimal distance 21 between an end of the weighing platform 15 and an end of the unrolling device 10. A cross-switch 23 is provided in the operational line 22 of the force sensor 19, which generated an electrical signal when the bale gravity center crosses the operational line of the force sensor 19. A per se known inklinomat 24, e.g., type EKN 455 of the firm TWK-Electronik, Dusseldorf, Germany, is provided on the unrolling device 10 in order to correct, on one hand, the inclination of the unrolling device and, on the other hand, the longitudinal tilt and the transverse tilt of the baler 1 which result in false weighing data. The force sensor 19 and the inklinomat 24 and, if necessary, the cross-switch 23 are operationally connected with an evaluation unit, not shown, and an output unit, likewise not shown, e.g., a display, a printer, or an electronic memory.

The weighing platform 15, which is integrated in the unrolling device 10, functions as follows:

After a bale 11 is formed and the rear housing part 4 pivots into its open position, the bale 11 falls immediately on the unrolling device 10 which is in its upper position. Because of the bale weight, the unrolling device 10 pivots downward until it is supported on the ground, forming an inclined surface. The bale 11 rolls in the unrolling direction 16 and onto the weighing platform 15. When the bale gravity center intersects the operational line 22 of the force sensor 19, the cross-switch 23 generates a signal, and the measurement of the normal force 25 applied by the bale 11 to the weighing platform 15 takes place which then recalculated in the evaluation device, taking the angle, which the rolling direction forms with a horizontal, and further inclinomat signal into account, into an actual bale weight which is shown or registered by the output device.

Figure 2:
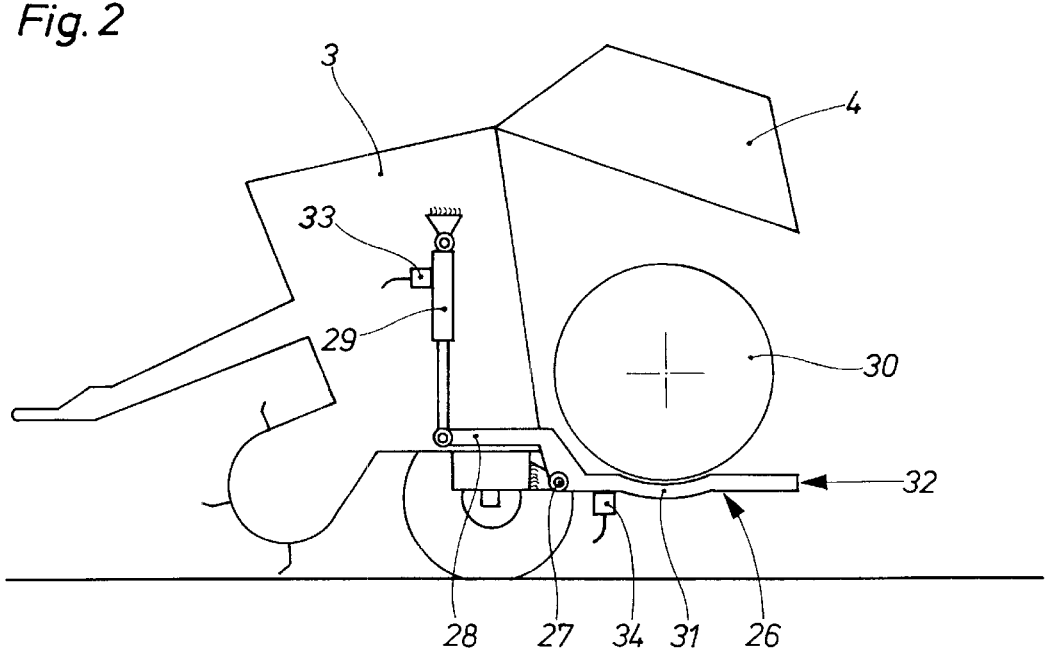
FIG. 2 a schematic side view of a second embodiment of a round baler according to the present invention.

The principle represented in FIG. 2 is based on measuring the pressure of lowering of a unrolling device 26. The unrolling device 26 pivots about a stationary axle 27 which is provided at the lower end of the front housing part 3. The unrolling device 26 is connected by an angular lever 28 with a hydraulic cylinder 29 supported on the front housing 3. Upon opening of the rear housing part 4, the bale 30 falls into a cavity 31 which occupies, as a result, a predetermined geometrical position under the bale weight, the unrolling device 26 moves downward against the pressure in the hydraulic cylinder 29. The geometry between the unrolling device 26 and the hydraulic cylinder 29 is so selected that the hydraulic cylinder 29 and the unrolling device 26 form a right angle when the unrolling device 26 occupies a horizontal position 32. The weight of the bale 30 is determined by the lever principle. In the delivery conduit of the hydraulic cylinder 29, there is provided a pressure sensor 33. An angular sensor 34, which is mounted on the unrolling device 26 insures that the unrolling device occupies a correct horizontal position. Both sensors are connected with the evaluation device. Upon further sinking of the unrolling device 26, the bale 30 rolls out of the cavity 31 on the ground.

Figure 3:
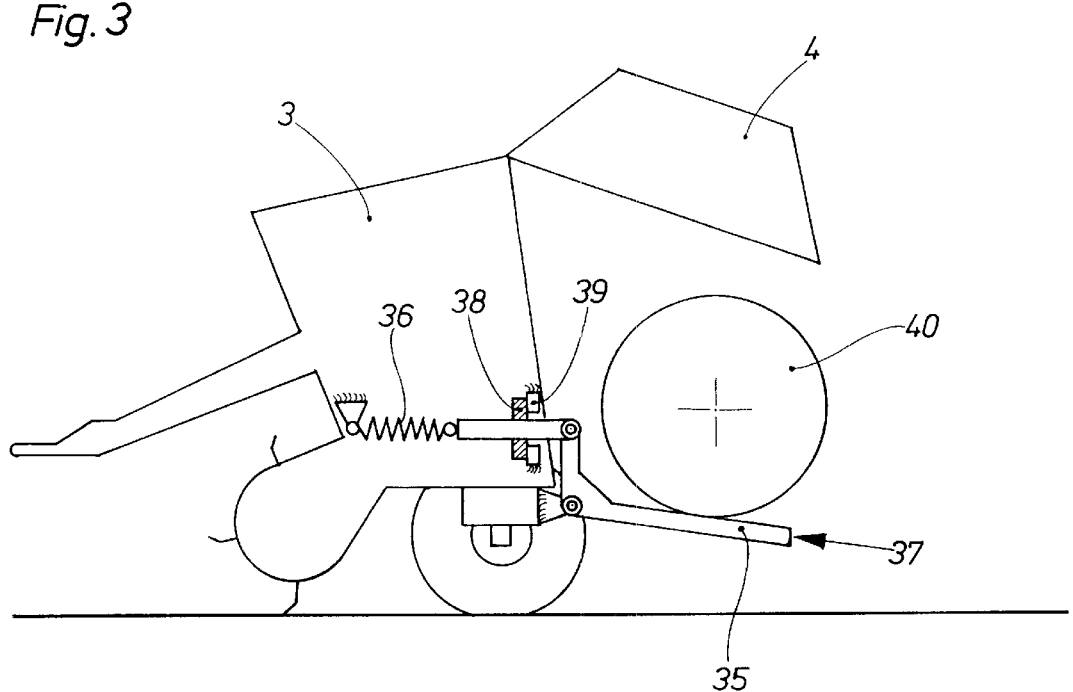
FIG. 3 a schematic side view of a third embodiment of a round baler according to the present invention.

In the embodiment of a baler shown in FIG. 3, an unrolling device 35 is held in its upper, not shown, position by a tension spring 36. In its lower position 37, a force sensor 38, which is fixedly connected with the unrolling device 35, is supported against a stationary stop 39 in such a manner that the unrolling device 35 forms an inclining plane not supported on the ground. When the bale 40 falls onto the unrolling device 35, the device 35, together with the bale 40, is displaced downwardly against the force of the spring 36 until the force sensor 38 abuts the stop 39. Upon further rolling off of the bale 40, an increasing force signal is generated due to the lever action that reaches its maximum at the end of the unrolling device 35. Based on the inclination angle of the unrolling device 35 and the lever arm ratio an evaluation device calculates, with the aid of signals of piezo force ring, the gravity force or weight of the bale 40, taking into account the force of the spring 36.

Figure 4:
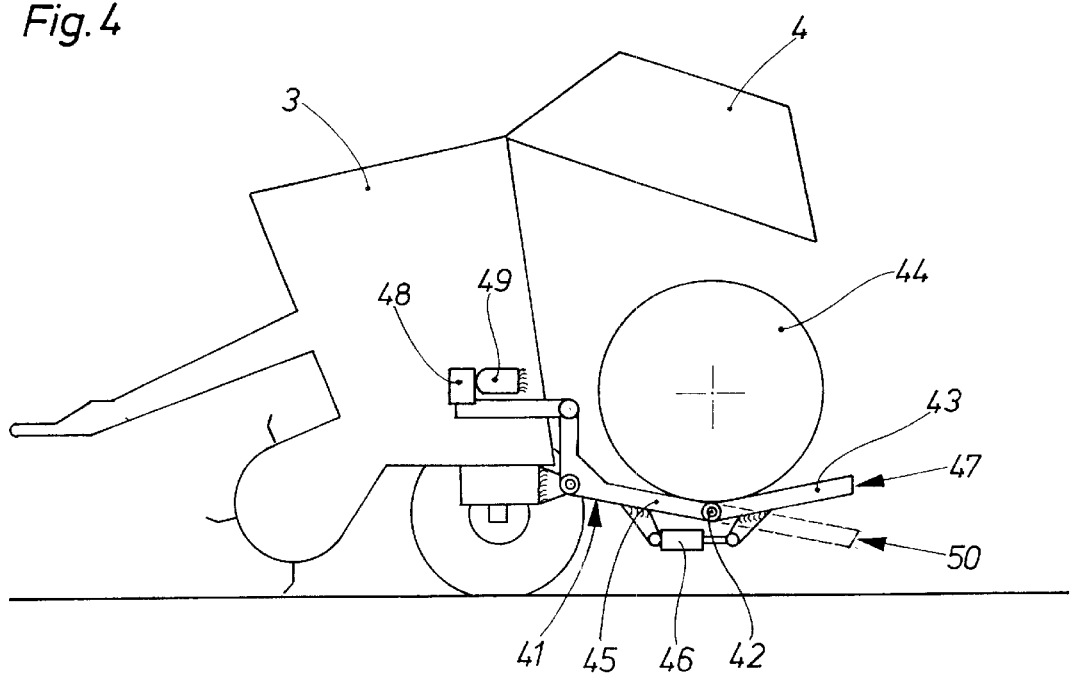
FIG. 4 a schematic side view of a fourth embodiment of a round baler according to the present invention.

In the embodiment of a baler shown in FIG. 4, the unrolling device 41 is formed as shears 43 adjustable about a horizontal transverse axle 42. With this principle, the shears 43 are adjusted to a static position in which a round bale 44 is kept in a stationary position and is weighed in this position. The unrolling device 41 functions as follows: before the ejection of the bale 44, the shears halves 43, 45 are kept by a hydraulic cylinder 46 in a position shown in FIG. 4 with solid lines. A stop 48, which is connected with the unrolling device 41, is supported against a pressure force sensor 49 provided on the front housing part 3. After a bale 44 has been ejected, it falls into the cavity formed by the shears halves 43 and 45 and is kept there until a correct measurement is taken. The pressure force sensor 49 generates a measurement signal based on the lever ratio which signals is recalculated in an evaluation device in a bale weight, taking into account a correction coefficient. After the weighing process, the hydraulic cylinder 46 is released, and the rear shears half 43 pivots into its unrolling position 50 shown in FIG. 4 is dash lines.

Figure 5:
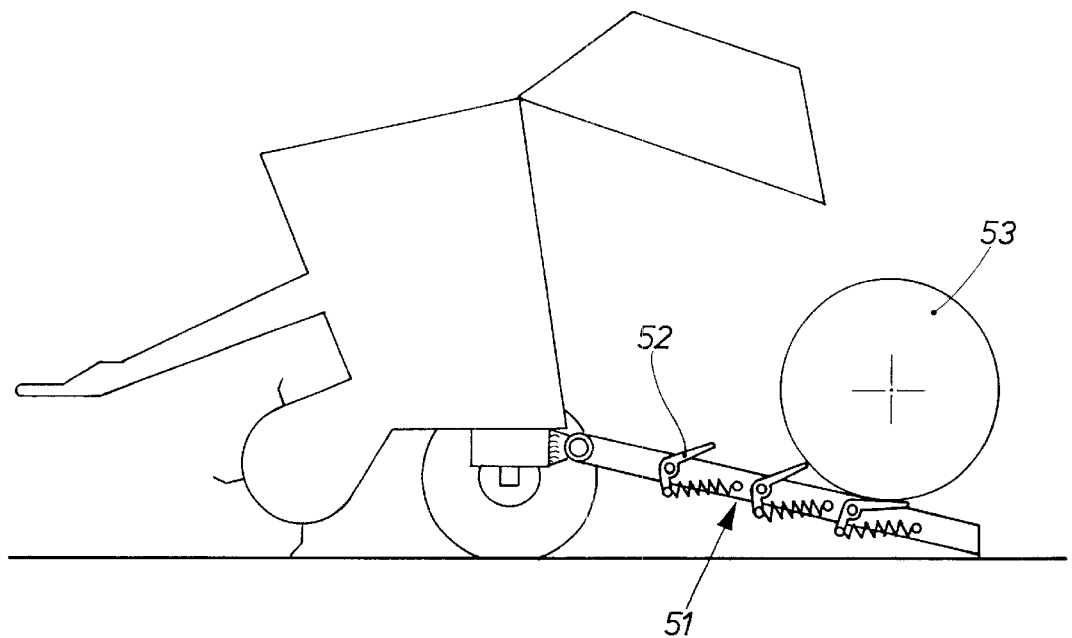
FIG. 5 a schematic side view of a fifth embodiment of a round baler according to the present invention.

In the embodiment shown in FIG. 5, the unrolling device 51 is formed of three, spaced from each other, cross-over switches 52 each of which generates a signal when a bale 53 or its center of gravity passer over it. The distance between the switches 52 remains constant. The time span between the switches 52 can be easily defined. Based on the travel path, time, and the inclination angle of the unrolling device 51 to a horizontal, the bale acceleration is calculated. Then, taking into consideration the bale dimensions, density of the material, and the friction coefficient, the bale mass is calculated. Generally, at least two switches 52 may be sufficient for simple calculation of the bale acceleration.

Figure 6:
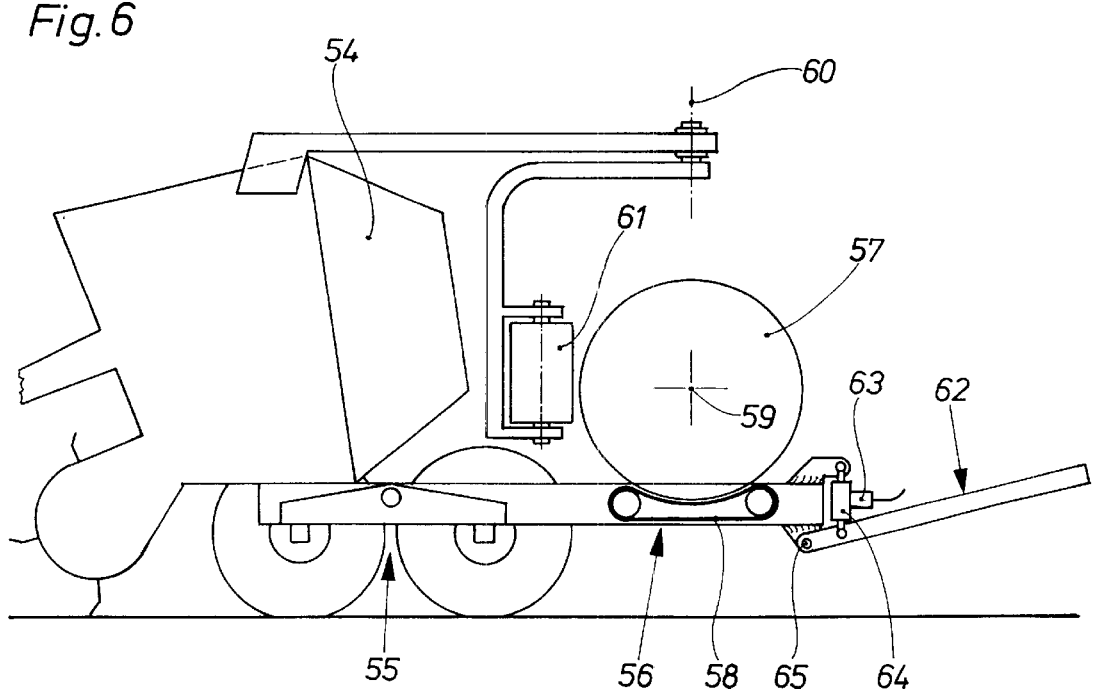
FIG. 6 a partial side view of a round baler according to the present invention with an integrated device for wrapping of bales and with unrolling and weighing devices.

The above-described and shown weighing devices, which are formed as unrolling devices, can be mounted not only on balers but also on devices for wrapping the bales. FIG. 6 shows a partial view of a round baler 54 mounted on chassis 55 and including a device 56 for wrapping of bales 57 with a film. Round bales 57, upon being ejected, are first transported onto a wrapping table 58 which rotates round bales 57 about their cylindrical axis 59. During their rotation, the round bales 57 are wrapped with film by a roller 61 rotatable about a vertical axis 60. In order to prevent the wrapped round bale 57 from falling on the ground from a relatively large height when it leaves the wrapping table 58, the bale 57 is first transferred onto an unrolling device 62 which then lowers the bale 57 to the ground. The weighing of the bale 57 can be effected by using, e.g., a pressure sensor 63 arranged in the hydraulic circuit of the hydraulic cylinder 64 which pivots the unrolling device 62 about a pivot axle 65 to lower the device 62 to the ground.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and present invention included all variations and/or alternative embodiments within the spirit and scope of the present invention as defined by the appended claims.

What is claimed is:

1. A round baler for forming round bales of harvest products, comprising a compression chamber housing in which the round bales are formed; and a weighing device for determining weight of compressed bale and formed as a unrolling device arranged downstream of an ejection side of the compression chamber housing for determining weight during rolling of the bale away from the compression chamber.

2. A round baler as set forth in claim 1, wherein the unrolling device comprises a frame, a weighing platform supported on the frame, and at least one force sensor for supporting the weighing platform on the frame.

3. A round baler as set forth in claim 2, wherein the weighing platform is formed as a normal force measuring device for measuring a normal force applied by the bale as it rolls along the weighing platform.

4. A round baler as set forth in claim 2, wherein the unrolling device further comprises a horizontal axle extending transverse to a travel direction of the baler and around which the weighing platform pivots as the bale rolls therealong, the force sensor being spaced from the axle a predetermined distance rearwardly with respect to the travel direction of the baler.

5. A round baler as set forth in claim 2, wherein a rear, with respect to a travel direction of the baler, end of the weighing platform is spaced, viewed in the travel direction of the baler, from a rear, with respect to the travel direction, end of the unrolling device a predetermined distance.

6. A round baler as set forth in claim 2, further comprising means for generating a signal when a center of gravity of a bale passes through an operational line of the force sensor.

7. A round baler as set forth in claim 6, wherein the signal generating means comprises one of a cross-over switch and an electronic time function element.

8. A round baler as set forth in claim 1, further comprising a chassis on which the compression chamber housing is mounted, and one of force, pressure, and torque measuring devices for connecting the unrolling device with the baler chassis and for measuring a force applied to the unrolling device as a result of a bale weight acting on the unrolling device, the load applied to the unrolling device being measured in an inclined position of the rolling device when a center of gravity of the bale passes through a free, spaced from the ground, end of the unrolling device.

9. A round baler as set forth in claim 1, further comprising a chassis on which the compression chamber housing is mounted, and a device for wrapping the compressed bales with a film and arranged at the ejection side of the compression chamber housing, and wherein the unrolling device is connected with the wrapping device for lowering the wrapped bales onto the ground.

10. A round baler for forming round bales of harvest products, comprising a compression chamber housing in which the round bales are formed; a weighing device for determining weight of compressed bale and formed as a unrolling device arranged downstream of an ejection side of the compression chamber housing; and a device for measuring an angle the unrolling device forms with a horizontal.

11. A round baler form forming round bales of harvest products, comprising a compression chamber housing in which the round bales are formed; a weighing device for determining weight of compressed bale and formed as a unrolling device arranged downstream of an ejection side of the compression chamber housing; and a device for correcting a false weight measurement resulting from inclination of the baler.

12. A round baler as set forth in claim 11, wherein the correcting device is formed as an inclinomat.

13. A round baler as set forth in claim 11, wherein the correcting device is arranged on the unrolling device.

14. A round baler form forming round bales of harvest products, comprising a compression chamber housing in which the round bales are formed; a weighing device for determining weight of compressed bale and formed as a unrolling device arranged downstream of an ejection side of the compression chamber housing; and a chassiton which the compression chamber housing is mounted, and one of force, pressure, and torque measuring devices for connecting the unrolling device with the baler chassis and for measuring a force applied to the unrolling device as a result of a bale weight acting on the unrolling device to lower the device in a horizontal measuring position, the lowering force serving as a measure of the bale weight, wherein the unrolling device has a cavity and is being lowered to the horizontal measuring position upon the bale being received in the cavity.

15. A round baler for forming round bales of harvest products, comprising a compression chamber housing in which the round bales are formed; and a weighting device for determining weight of compressed bale and formed as a unrolling device arranged downstream of an ejection side of the compression chamber housing, wherein the unrolling device is formed as adjustable shears having a first, weighing position, in which halves of the shears form a cavity for retaining a bale therein for a time period necessary to effect a correct measurement, and a second, unrolling position in which the shear halves form an inclined plane along which the bale rolls onto the ground.

* * * * *